United States Patent
Dine et al.

(10) Patent No.: US 6,477,764 B1
(45) Date of Patent: Nov. 12, 2002

(54) APPARATUS FOR COMPUTER HARD DRIVE ASSEMBLY

(75) Inventors: Charles L. Dine, Pine River, WI (US); Francis A. Guidry, Plover, WI (US)

(73) Assignee: Banta Corporation, Menasha, WI (US)

( * ) Notice: Subject to any disclaimer, the term of this patent is extended or adjusted under 35 U.S.C. 154(b) by 78 days.

(21) Appl. No.: 09/678,515

(22) Filed: Oct. 3, 2000

(51) Int. Cl.[7] .................... G11B 5/127; H04B 31/00
(52) U.S. Cl. .................. 29/603.03; 29/701; 29/705; 29/721; 29/729; 29/756; 29/281.1; 29/281.4; 29/281.5; 29/281.6; 269/71; 269/303
(58) Field of Search ............... 29/701, 705, 721, 29/729, 756, 281.1, 281.4, 281.5, 281.6, 603.06; 269/71, 303

(56) References Cited

U.S. PATENT DOCUMENTS

| | | | |
|---|---|---|---|
| 4,078,302 A | * 3/1978 | Fok et al. | 29/741 |
| 4,327,786 A | * 5/1982 | Markkula | 144/154 |
| 4,592,690 A | * 6/1986 | Busch | 413/19 |
| 4,862,719 A | * 9/1989 | Kajrup et al. | 72/105 |
| 4,875,276 A | * 10/1989 | Yunokuchi et al. | 29/603 |
| 4,884,611 A | * 12/1989 | Schmidt | 157/1.24 |
| 5,117,962 A | * 6/1992 | Tommarello et al. | 198/378 |
| 5,119,536 A | * 6/1992 | Leitz et al. | 29/566.3 |
| 5,150,624 A | * 9/1992 | Kaczmarek et al. | 73/865.9 |
| 5,179,775 A | * 1/1993 | Bogotzek et al. | 29/564.4 |
| 5,224,148 A | * 6/1993 | Baker et al. | 378/181 |
| 5,392,507 A | * 2/1995 | Juncker et al. | 29/603 |
| 5,404,636 A | * 4/1995 | Stefansky et al. | 29/603 |
| 5,465,476 A | * 11/1995 | Krajec et al. | 29/759 |
| 5,783,123 A | * 7/1998 | Edwards et al. | 264/39 |
| 5,903,969 A | * 5/1999 | Haga | 29/603.18 |
| 5,937,764 A | * 8/1999 | Olivier | 108/20 |
| 6,192,803 B1 | * 2/2001 | Nishino | 104/93 |
| 6,212,759 B1 | * 4/2001 | Liu et al. | 29/603.03 |
| 6,295,717 B1 | * 10/2001 | Chuang et al. | 29/603.03 |

* cited by examiner

Primary Examiner—Peter Vo
Assistant Examiner—Paul Kim
(74) Attorney, Agent, or Firm—Foley & Lardner

(57) ABSTRACT

A computer hard drive assembly device is described which can include a turntable, a motor, and a control. The turntable can include a platform configured to secure computer hard drive components to the turntable. The motor can be coupled to the turntable by a rotating drive shaft which allows the motor to rotate the turntable. The control can be coupled to the motor and is coupled to engage the motor. A method for computer hard drive assembly using the device is also provided.

5 Claims, 4 Drawing Sheets

APPARATUS FOR COMPUTER HARD DRIVE ASSEMBLY

FIELD OF THE INVENTION

The present invention relates to manufacturing assembly fixtures and devices. More particularly, the present invention relates to computer hard drive assembly fixtures and devices.

BACKGROUND OF THE INVENTION

In general, conventional assembly processes for computer hard drives are cumbersome. Typically, the person assembling the computer hard drive must hold the hard drive components in alignment and in a fixed position for assembly. Moreover, the person may need to turn the hard drive in a variety of different positions and angles in order to properly install and attach all the necessary components of the hard drive. This manual process is slow and inefficient. The holding of components in alignment may be awkward or physically difficult for some people. Having to hold the components and perhaps move them around during assembly may lead to the hard drive being dropped and physically damaged or improperly assembled. Furthermore, the manual manipulations of the conventional process may lead to medical problems for the person assembling the hard drive, such as, carpal tunnel syndrome.

Conventional assembly processes for computer hard drives also do not allow for testing until assembly steps are completed. For example, operational light emitting diodes (LEDs) coupled to the computer hard drive to show various operations of the hard drive are not generally tested until after assembly of the hard drive. This limitation can be expensive and time-consuming, especially considering how fragile the LED connects are.

Thus, there is a need for computer hard drive assembly fixtures or devices which hold the hard drive components in alignment and in a fixed position during assembly. Further, there is a need for a computer hard drive assembly device which mechanically manipulates the computer hard drive in an efficient, safe, and productive manner. Even further, there is a need for a hard drive assembly device which reduces the ergonomic problems associated with the conventional computer hard drive assembly process. Even still further, there is a need for an assembly device or fixture which tests computer hard drive LEDs during the assembly process.

BRIEF SUMMARY OF THE INVENTION

One aspect of an exemplary embodiment of the invention relates to a computer hard drive assembly device including a turntable, a motor, and a control. The turntable includes a platform configured to secure computer hard drive components to the turntable. The motor is coupled to the turntable by a rotating drive shaft and is configured to rotate the turntable. The control is coupled to the motor and configured to engage the motor.

Briefly, another exemplary embodiment relates to a method of assembling a computer hard drive. The method includes testing equipment associated with a component of the computer hard drive, locating a sled assembly and a printed circuit assembly (PCA) board on a first platform, coupling the sled assembly and the PCA board together, locating the coupled sled assembly, PCA board, and a drive on a second platform, and selectively engaging a motor to move the second platform to complete assembly of the computer hard drive.

Briefly, another exemplary embodiment relates to a device configured for the assembly of an item having multiple components. The device includes means for securing an item to a movable section, means for moving the movable section, and means for engaging the moving means.

Other principle features and advantages of the present invention will become apparent to those skilled in the art upon review of the following drawings, the detailed description, and the appended claims.

BRIEF DESCRIPTION OF THE DRAWINGS

The invention will become more fully understood from the following detailed description, taken in conjunction with the accompanying drawings, wherein like reference numerals denote like elements, in which.

DETAILED DESCRIPTION OF EXEMPLARY EMBODIMENTS

Figure 1:
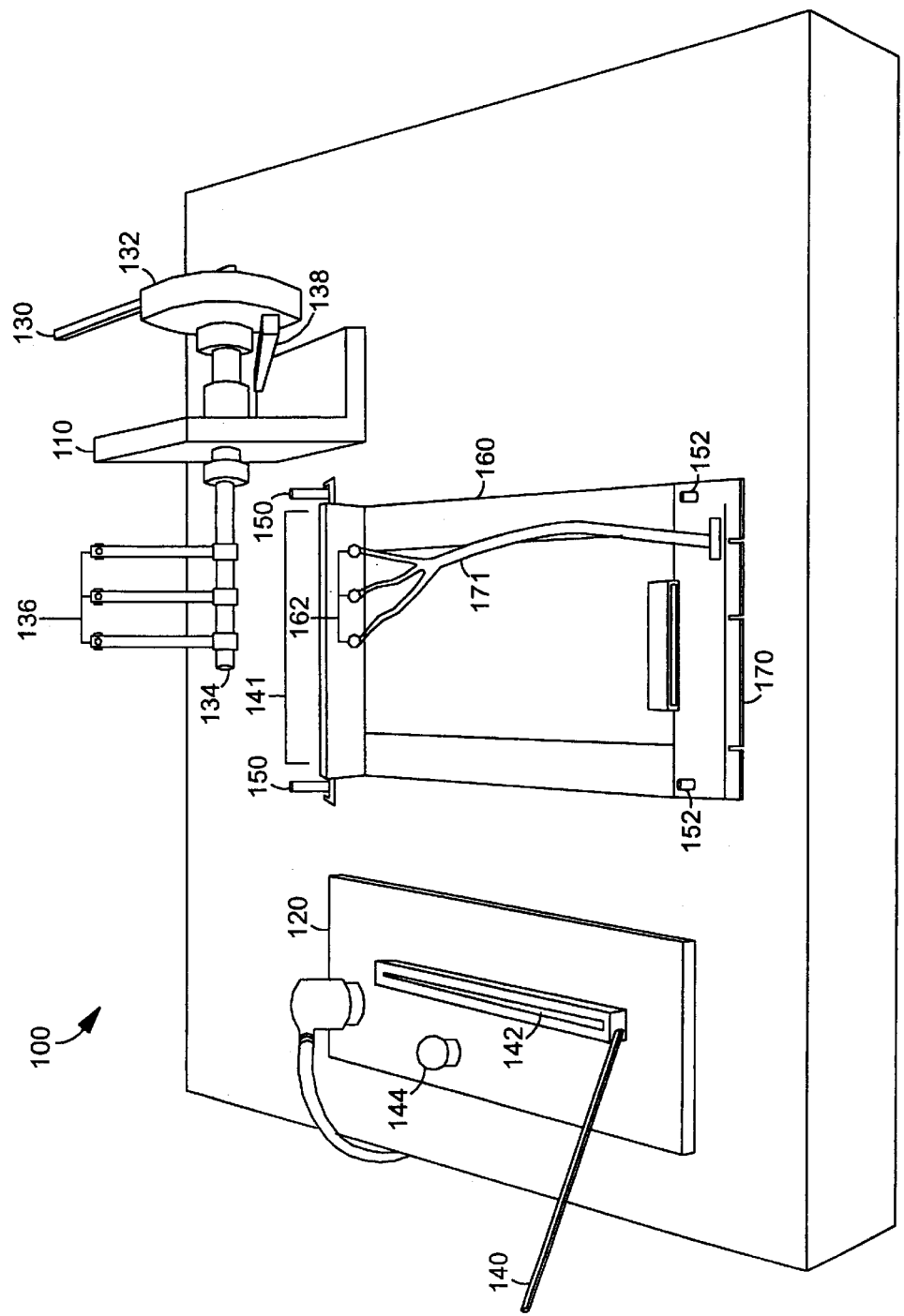
FIG. 1 is a perspective view of a computer hard drive assembly fixture used in a first stage of a computer hard drive assembly process.

Referring now to the FIGURES, and specifically to FIG. 1, a computer hard drive assembly and testing station 100 includes a fixture 110, a test fixture 120, and a sled receiving section 141. In an exemplary embodiment, station 110 is used in a first stage of a computer hard drive assembly process. Sled receiving section 141 receives computer hard drive components, such as, a sled and a circuit board. Other computer hard drive components, such as, the drive can be received on a sled located on sled receiving section 141 or, preferably, the drive can be received on the sled during a later stage in the assembly process. In an alternative embodiment, station 110 can include other structures used in the computer hard drive assembly and testing process. In an exemplary embodiment, fixture 100 is advantageously utilized to test the functionality of light emitting diodes (LEDs) associated with a computer hard drive. Alternatively, other functions of the hard drive can also be tested on fixture 100.

In an exemplary embodiment, fixture 110 includes a fixture handle 130, a rotating disc 132, a rotating shaft 134, arms 136, and a stopper 138. Fixture handle 130 is coupled to rotating disc 132 and rotating shaft 134. Arms 136 are coupled to rotating shaft 134 and move when fixture handle 130 rotates rotating disc 132 and rotating shaft 134. Fixture handle 130 is rotated up to a point where stopper 138 prevents further rotation.

Test fixture 120 includes a handle 140, a test input slot 142, and a power light 144. Handle 140 pivots to open and close connections provided in test input slot 142 which are configured to electrically couple a circuit board inserted in slot 142 to test fixture 120. Sled receiving section 141 includes guide pegs 150 and fixture pegs 152 which are configured to receive and secure a computer hard drive sled 160. Computer hard drive sled 160 includes sled sockets 162 into which light emitting diodes (LEDs) for the computer hard drive are inserted. In an exemplary embodiment, rotation of fixture handle 130 locates arms 136 in position to secure LEDs in sled sockets 162.

In an exemplary computer hard drive assembly and testing method, computer hard drive sled 160 is located in sled receiving section 141. A printed circuit assembly (PCA)

board 170 (another component of the computer hard drive being assembled) is located on fixture pegs 152 at one end of sled 160. LED lights are inserted into sled sockets 162 and fixture handle 130 is rotated such that arms 136 help LED lights click into place in sled sockets 162 of sled 160. An LED cable 171 couples LED lights to PCA board 170.

After LED lights are secured in sled sockets 162, PCA board 170 is removed from fixture pegs 152 and inserted into test input slot 142 of test fixture 120. Handle 140 is rotated both to lock PCA board 170 into position within input slot 142 and to electrically secure the connection between test fixture 120 and PCA board 170. Once power is applied to test fixture 120, as indicated by power light 144, properly functioning LED lights in sled sockets 162 light up. If LED lights in sled sockets 162 do not light after power is applied, there is some problem, such as, LED lights are not correctly inserted, LED cable 171 is not attached properly, PCA board 170 is not functioning properly, etc. Advantageously, station 100 allows testing of LED lights before final assembly of the computer hard drive is completed.

After testing of the LED light is completed, handle 140 is rotated to release PCA board 170 and allow it to be removed from test input slot 142. PCA board 170 is returned to fixture pegs 152 at the end of sled 160. Once testing of the LED lights has been completed, sled 160 and PCA board 170 are removed to a second stage of assembly. An exemplary embodiment of a second stage of assembly is described below with reference to FIG. 2.

Figure 2:
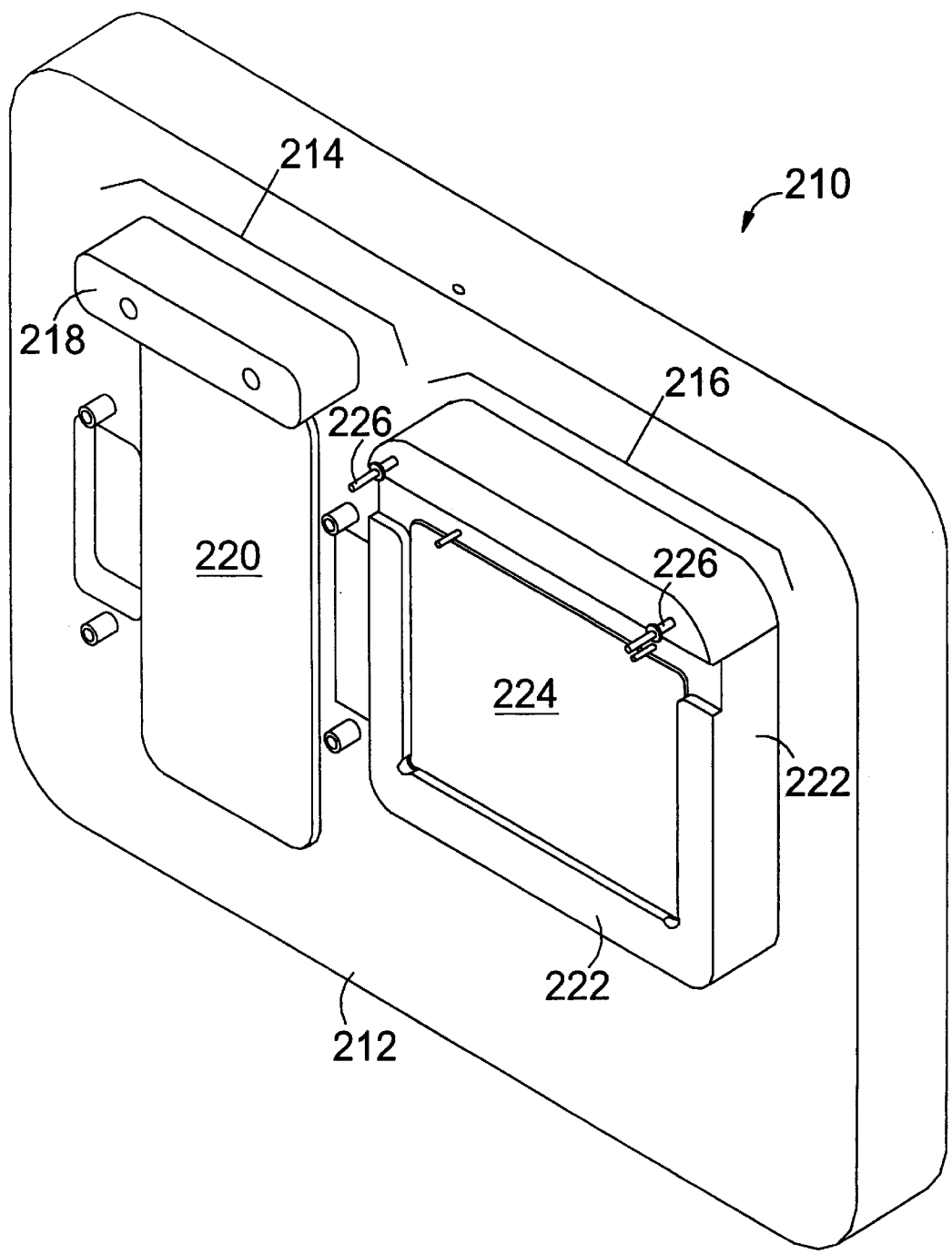
FIG. 2 is a perspective view of a computer hard drive assembly fixture used in a second stage of a computer hard drive assembly process.

FIG. 2 illustrates a fixture 210 including a platform 212 with a portion 214 and a portion 216. In an exemplary embodiment, fixture 210 is used in a second stage of a computer hard drive assembly process. During the exemplary second stage of assembly, no computer hard drive components are tested. Instead, during the second stage, computer hard drive sled 160, PCA board 170, and a drive are connected. In an alternative embodiment, fixture 210 can include other structures used in the computer hard drive assembly process.

Portion 214 includes a backstop 218 and a tray pad 220. In an exemplary embodiment, portion 214 is utilized to locate computer hard drive components, such as, computer hard drive sled 160 and PCA board 170 described with reference to FIG. 1. Portion 216 includes guide rails 222, a pad 224, and machine locating pins 226. In an exemplary embodiment, portion 216 is utilized to locate computer hard drive components, such as, a drive.

In one embodiment, portion 216 secures computer hard drive components in a fixed position during the assembling process. The securing of computer hard drive components holds parts in alignment and fixed positions as to aid a person assembling the computer hard drive. In an exemplary embodiment, tray pad 220 and pad 224 are made from anti-static materials. Guide rails 222 and backstop 218 are also preferably anti-static in character.

Advantageously, fixture 210 assists a person with the assembly of the hard drive by securing hard drive components. In particular, fixture 210 helps couple the sled assembly and the PCA board of the computer hard drive to a drive. A person assembling a hard drive can position the hard drive using fixture 210 and free his or her hands for installing screws. Specifically, in an exemplary embodiment, the PCA board and the sled assembly are located at portion 214 and the drive is located at portion 216. PCA board with LED cable 171 is picked up and rotated one half revolution to the drive where the PCA is plugged in to the drive. The sled assembly is then rotated one half revolution clockwise to be in contact with the drive. Screws are placed in the drive slot positions and are screwed through the sled assembly into the drive. The sled and drive assembly is picked up and rotated one half revolution counter clockwise and located at portion 220 where the screws are placed in the PCA board slot positions and are screwed into the sled assembly. The coupled computer hard drive components are then removed from fixture 210. In one embodiment, fixture 210 is free standing and can be manually moved into any of a variety of positions.

Figure 3:
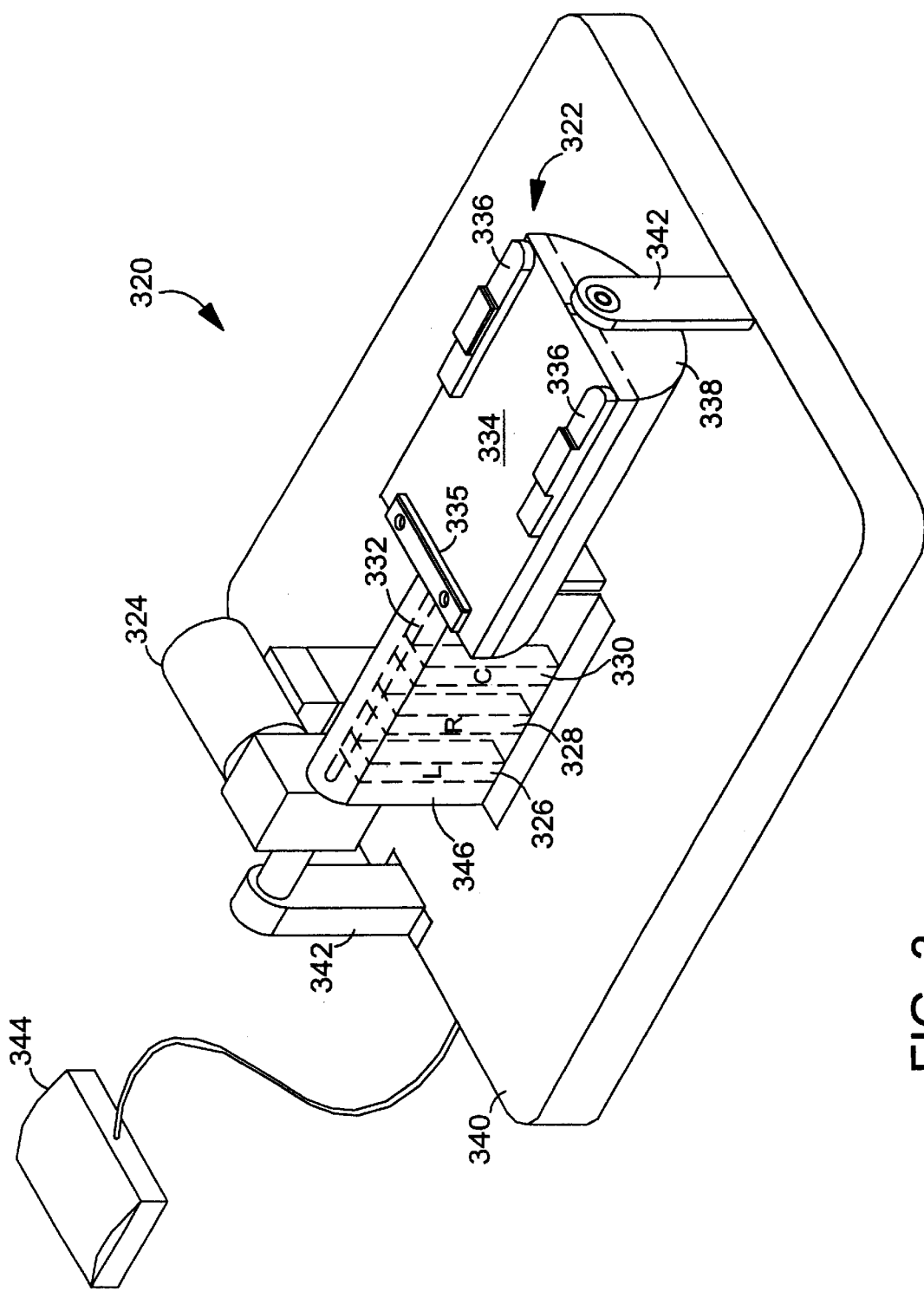
FIG. 3 is a perspective view of a computer hard drive assembly device used in a third stage of a computer hard drive assembly process.

FIG. 3 illustrates a device 320 including a turntable 322, a motor 324, limit switches 326, 328, 330, and a drive shaft 332. In an exemplary embodiment, device 320 is used in a third stage of a computer hard drive assembly process. In an alternative embodiment, device 320 can include other structures used in the computer hard drive assembly process. Turntable 322 preferably includes a flat platform section 334, a back stop 335, guide rails 336, and a half cylinder section 338. Turntable 322 provides support and securing for the computer hard drive components used in the assembly process. Turntable 322, motor 324, and drive shaft 332 are coupled to a base 340 by supports 342. In an exemplary embodiment, back stop 335, guide rails 336, and platform 334 are made from antistatic materials.

Motor 324 is preferably a direct current (DC) motor that rotates turntable 322 into different positions such that the operator can more easily install the assembly screws in the computer hard drive. Other motive devices or structures can be used to perform the function of motor 324. Preferably, motor 324 selectively rotates turntable 322 by use of a foot pedal 344. Alternatively, other controls may be used in lieu of foot pedal 344 to selectively engage motor 324, including, for example, a hand-driven crank. Advantageously, the person assembling the computer hard drive can rotate the turntable into any position in the range of movement of turntable 322.

Limit switches 326, 328, 330 are preferably coupled to drive shaft 332 and mark stopping locations for turntable 322 in the vertical left/right and horizontal positions. In alternative embodiments, other devices or structures can be used instead of limit switches. In an exemplary embodiment, limit switch 326 is a left vertical switch which marks the stopping location for turntable 322 in the left vertical position, limit switch 328 is a right vertical switch which marks the stopping location for turntable 322 in the right vertical position, and limit switch 330 is a center horizontal switch which marks the stopping location for turntable 322 in the horizontal or center position. In one embodiment, limit switches 326, 328, and 330 are encased by a cover 346.

In one example of the operation of device 320, a person places the sled assembly components described with reference to FIG. 2 and a drive on platform 334 of turntable 322. The assembly is secured in place by guide rails 336. Once secured, the operator works to attach a hard drive cover to the coupled sled assembly components and drive. When needed, the operator engages motor 324 using foot pedal 344 to move turntable 322 to a left vertical or right vertical position. As such, a person assembling the computer hard drive cover to the sled assembly can more easily use tools, such as, screw drivers to reach places on the hard drive which would otherwise require significant manual manipulation.

Advantageously, device 320 eliminates some of the ergonomic problems of manual assembly of hard drives. The human operator does not have to maneuver the hard drive components into awkward positions, nor hold the components with one hand while the other hand uses a tool. Risks of injury to the operator and the equipment are, consequently, reduced. Device 320 also advantageously increases efficiency and productivity by making the hard drive assembly easier for the operator.

Figure 4:
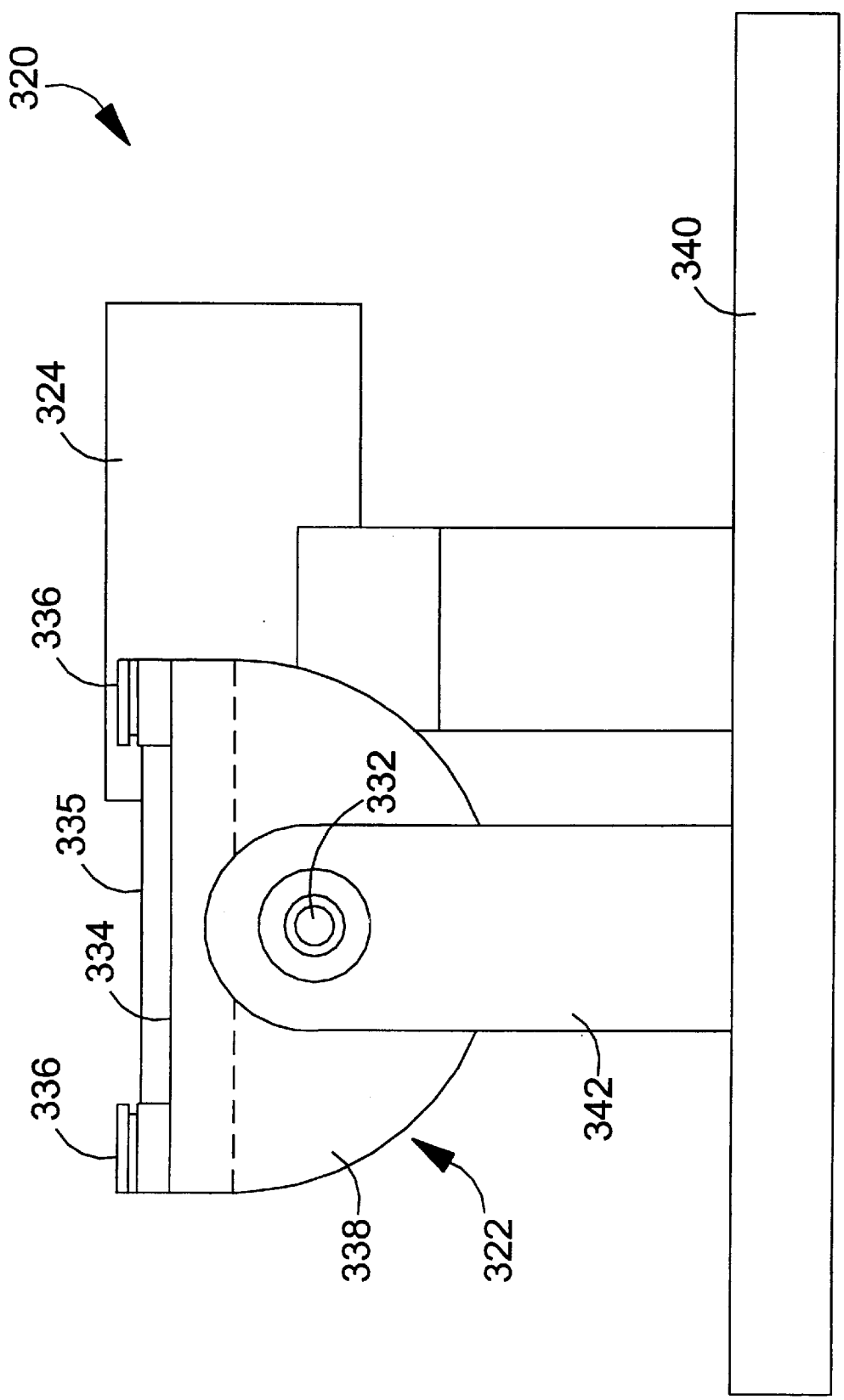
FIG. 4 is a side view of the computer hard drive assembly device illustrated in FIG. 3.

FIG. 4 illustrates a side view of device 320. Turntable 322 is pivotally coupled to supports 342 which are secured to base 340. Turntable 322 mechanically rotates by power provided by motor 324. Advantageously, turntable 322 rotates to locate computer hard drive components in positions which allow easy assembly by human assemblers.

While the exemplary embodiments illustrated in the FIGURES and described above are presently preferred, it should be understood that these embodiments are offered by way of example only. Other embodiments may include, for example, different configurations or structures for securing a computer hard drive during assembly. Further, different assembly operations can be performed at different stages than as described above in the exemplary assembly process. The invention is not limited to a particular embodiment but extends to various modifications, combinations, and permutations that nevertheless fall within the scope and spirit of the appended claims.

What is claimed is:

1. A computer hard drive assembly device comprising:
   a turntable, the turntable including a platform configured to secure computer hard drive components to the turntable;
   a motor coupled to the turntable by a rotating drive shaft having a longitudinal axis such that the platform extends along the longitudinal axis of the rotating drive shaft, the motor being configured to rotate the turntable around the longitudinal axis of the rotating drive shaft; and
   a control coupled to the motor and configured to engage the motor, wherein a back stop and guide rails are coupled to the platform, the back stop and guide rails including anti-static foam pads.

2. The computer hard drive assembly device of claim 1, further comprising at least one machine locating pin disposed on the platform.

3. The computer hard drive assembly device of claim 1, wherein the control comprises a foot pedal providing continuous control of motor operation.

4. The computer hard drive assembly device of claim 1, further comprising limit switches coupled to drive shaft and which mark stopping locations for the rotation of the turntable by the motor.

5. The computer hard drive assembly device of claim 4, wherein the limit switches comprise any of a vertical left limit switch, a vertical right limit switch, and a center limit switch.

* * * * *